United States Patent [19]
Lee

[11] Patent Number: 4,896,935
[45] Date of Patent: Jan. 30, 1990

[54] FIBER OPTIC SWITCH

[76] Inventor: Ho-Shang Lee, 1826 Curtis St., Berkeley, Calif. 94702

[21] Appl. No.: 268,046

[22] Filed: Nov. 7, 1988

Related U.S. Application Data

[63] Continuation of Ser. No. 945,385, Dec. 22, 1986, Pat. No. 4,834,488, which is a continuation-in-part of Ser. No. 785,166, Oct. 7, 1985, abandoned.

[51] Int. Cl.$^4$ .............................................. G02B 6/36
[52] U.S. Cl. ................................ 350/96.20; 350/96.15
[58] Field of Search ............... 350/96.13, 96.15, 96.18, 350/96.20, 96.21, 96.22

[56] References Cited

U.S. PATENT DOCUMENTS

| | | | |
|---|---|---|---|
| 4,146,856 | 3/1979 | Jaeschke | 335/151 |
| 4,189,206 | 2/1980 | Terai et al. | 350/96.2 |
| 4,220,396 | 9/1980 | Antell | 350/96.15 |
| 4,223,978 | 9/1980 | Kummer et al. | 350/96.2 |
| 4,229,068 | 10/1980 | Hodge et al. | 350/96.2 |
| 4,239,331 | 12/1980 | Aoyama | 350/96.2 |
| 4,278,323 | 7/1981 | Waldman | 350/96.20 |
| 4,322,126 | 3/1982 | Minowa et al. | 350/96.2 |
| 4,378,144 | 3/1983 | Duck et al. | 350/96.18 |
| 4,401,365 | 8/1983 | Mizokawa et al. | 350/96.20 |
| 4,407,562 | 10/1983 | Young | 350/96.2 |
| 4,415,229 | 11/1983 | McCullough | 350/96.20 |
| 4,452,507 | 6/1984 | Winzer | 350/96.2 |
| 4,512,627 | 4/1985 | Archer et al. | 350/96.21 X |
| 4,753,501 | 6/1988 | Battle | 350/96.20 |
| 4,834,488 | 5/1989 | Lee | 350/96.20 |

FOREIGN PATENT DOCUMENTS

| | | | |
|---|---|---|---|
| 2016498 | 10/1971 | Fed. Rep. of Germany | 350/96.20 |
| 56-111814 | 9/1981 | Japan | 350/96.13 |

OTHER PUBLICATIONS

Kondo, "Integrated Optical Switch Matrix for Single-Mode Fiber Networks", *IEEE J. Quant. Electronics*, vol. QE-18, No. 10, Oct. 1982, pp. 1759–1765.

"Optical Fiber Switch Driven by PZT Bimorph", by Ohmori & Ogiwara, *Applied Optics*, Nov. 15, 1978, vol. 17, No. 22, pp. 3531–3532.

"Moving Optical-Fiber Switch Experiment", by Yamamoto & Ogiwara, *Applied Optics*, Nov. 15, 1978, vol. 17, No. 22, pp. 3675–3678.

*Primary Examiner*—John D. Lee
*Attorney, Agent, or Firm*—Majestic, Parsons, Siebert & Hsue

[57] ABSTRACT

Two fixed input optical fibers may be aligned with two movable output optical fibers. The two output fibers are moved by exchanging the positions so that either output fiber may be optically aligned with either input fiber. In another optical switch either one of two movable fibers may be optically aligned with either one of two fixed fibers by rotating the movable member. In yet another optical switch a movable fiber may be aligned with one of a number of fixed optical fibers by rotating the movable member using a stepping motor. The angular positions of the fixed fibers are such that the input fiber is optically aligned with any one of the fibers by rotating the input fiber by a number of steps of the stepping motor.

12 Claims, 14 Drawing Sheets

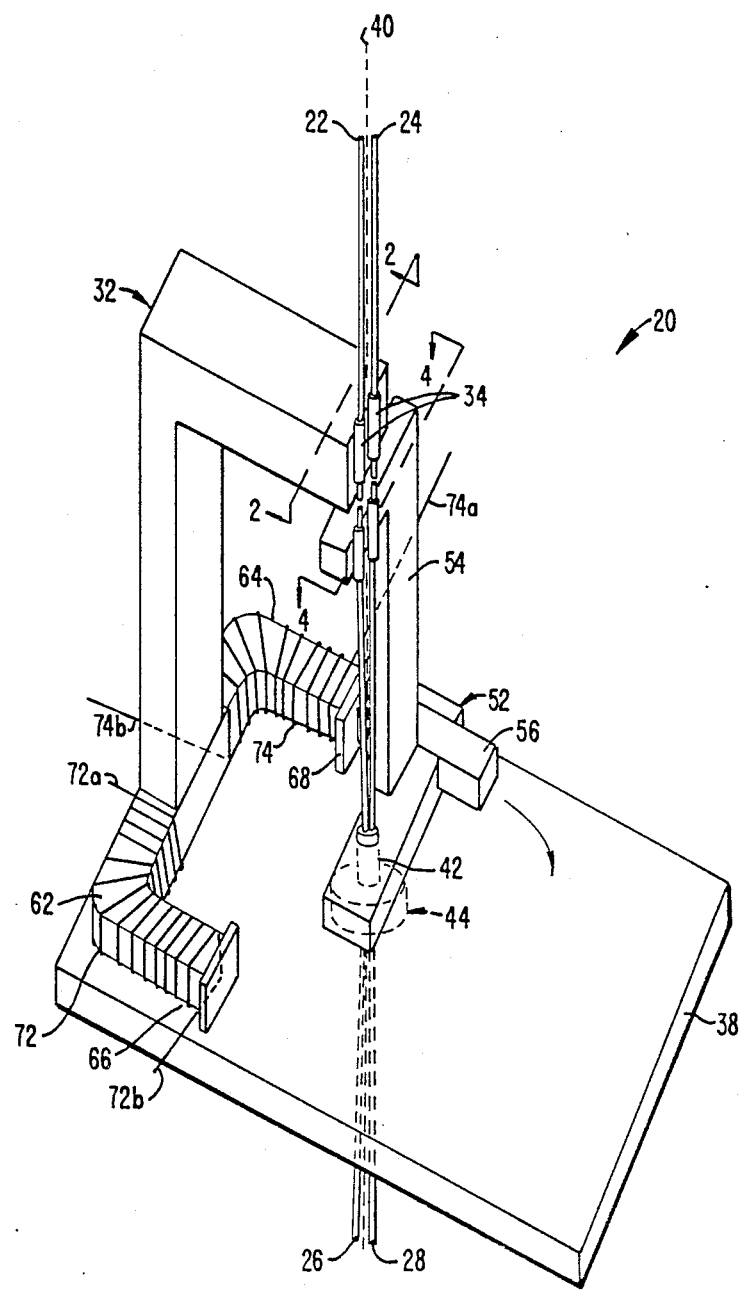
FIG._1.

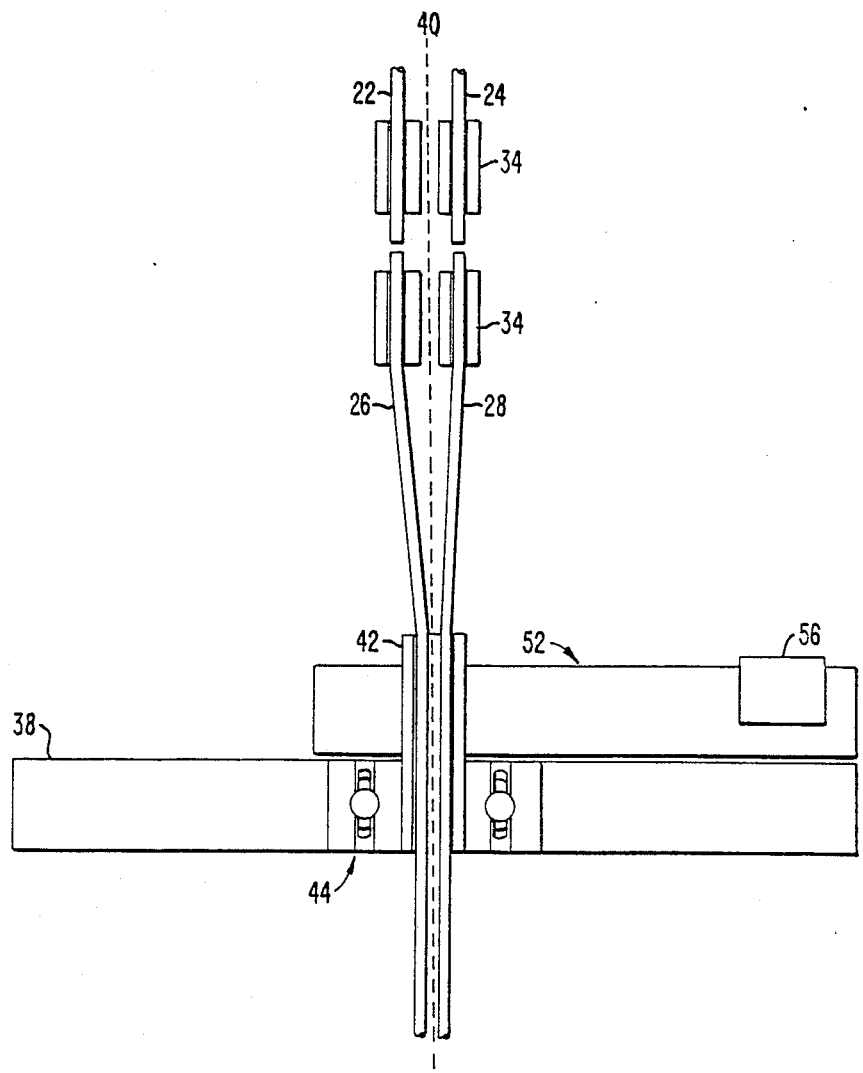
FIG._2.

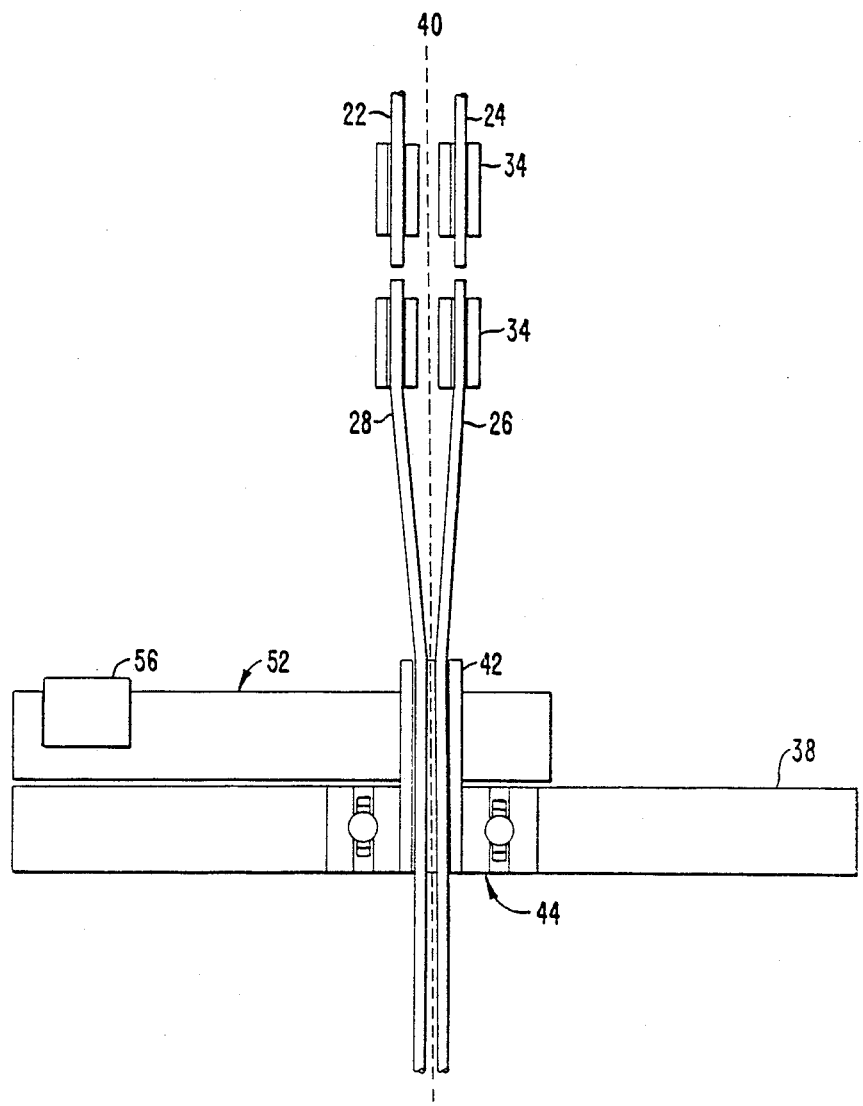
FIG._3.

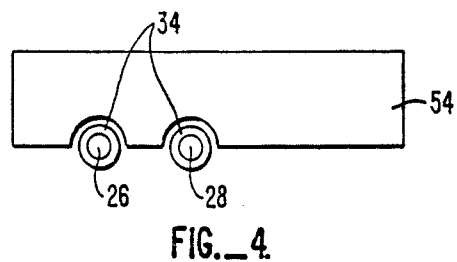
FIG._4.
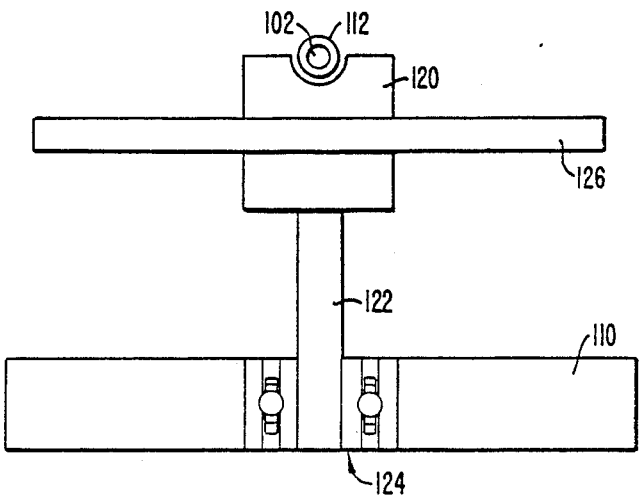
FIG._6.
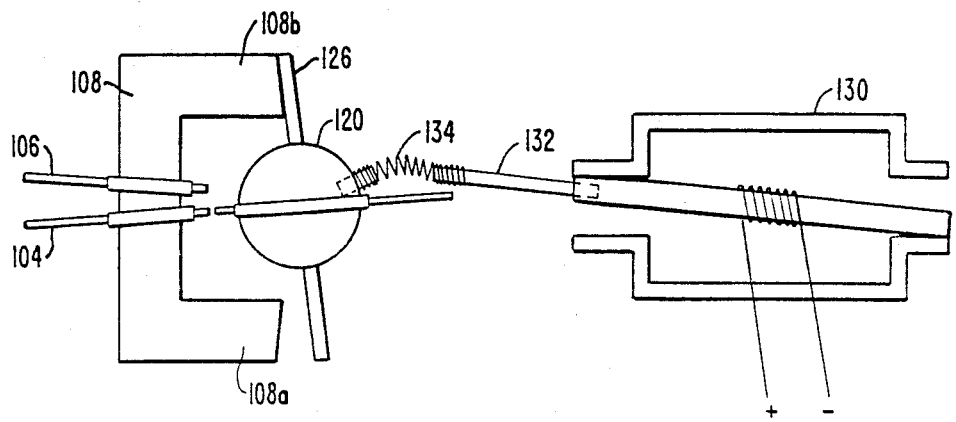
FIG._7.

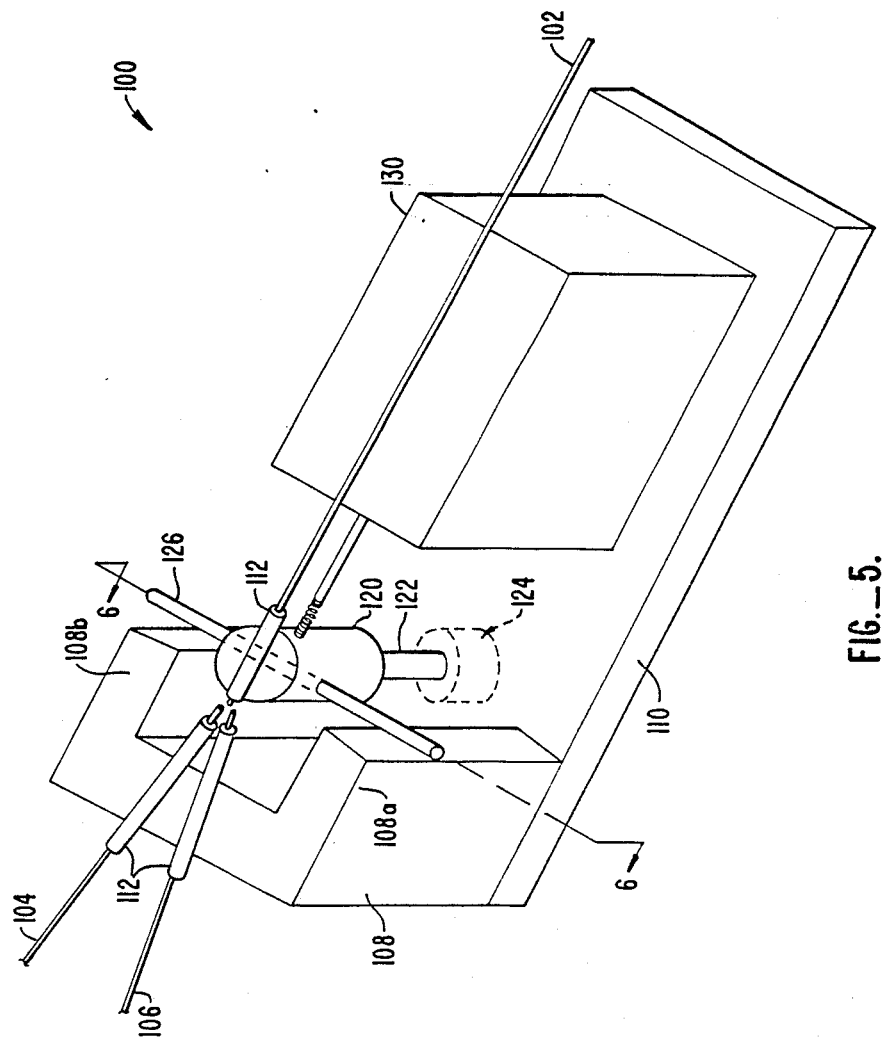
FIG.—5.

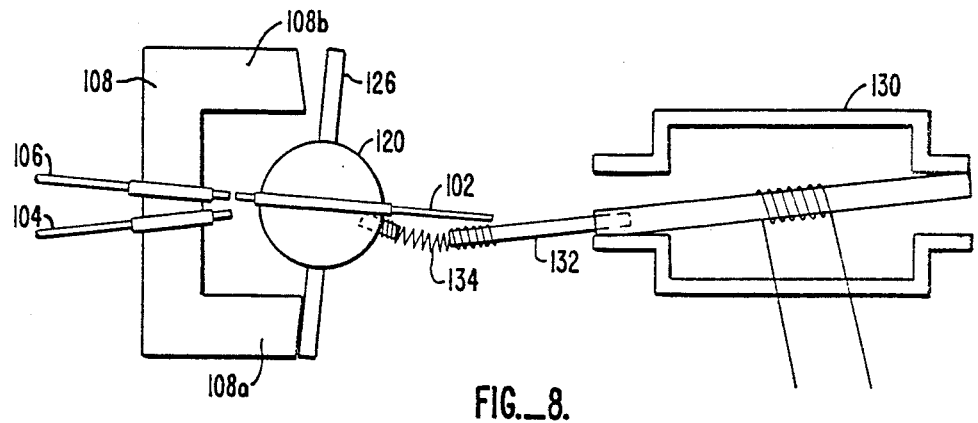
FIG._8.
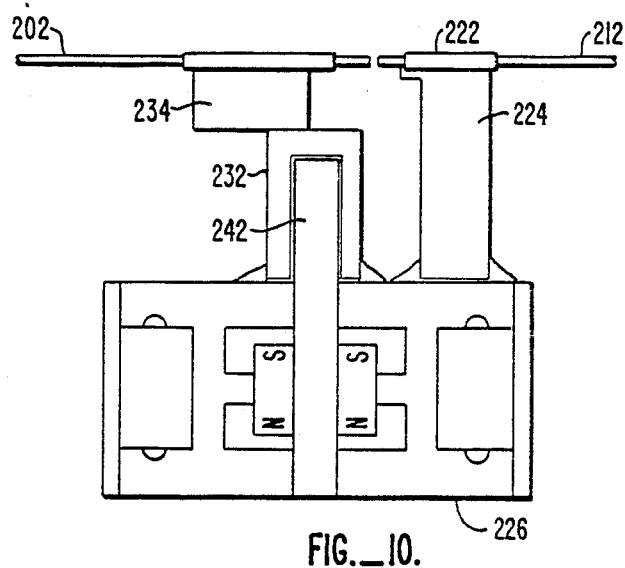
FIG._10.
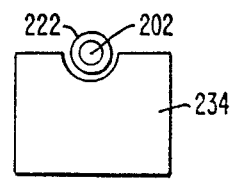
FIG._12.

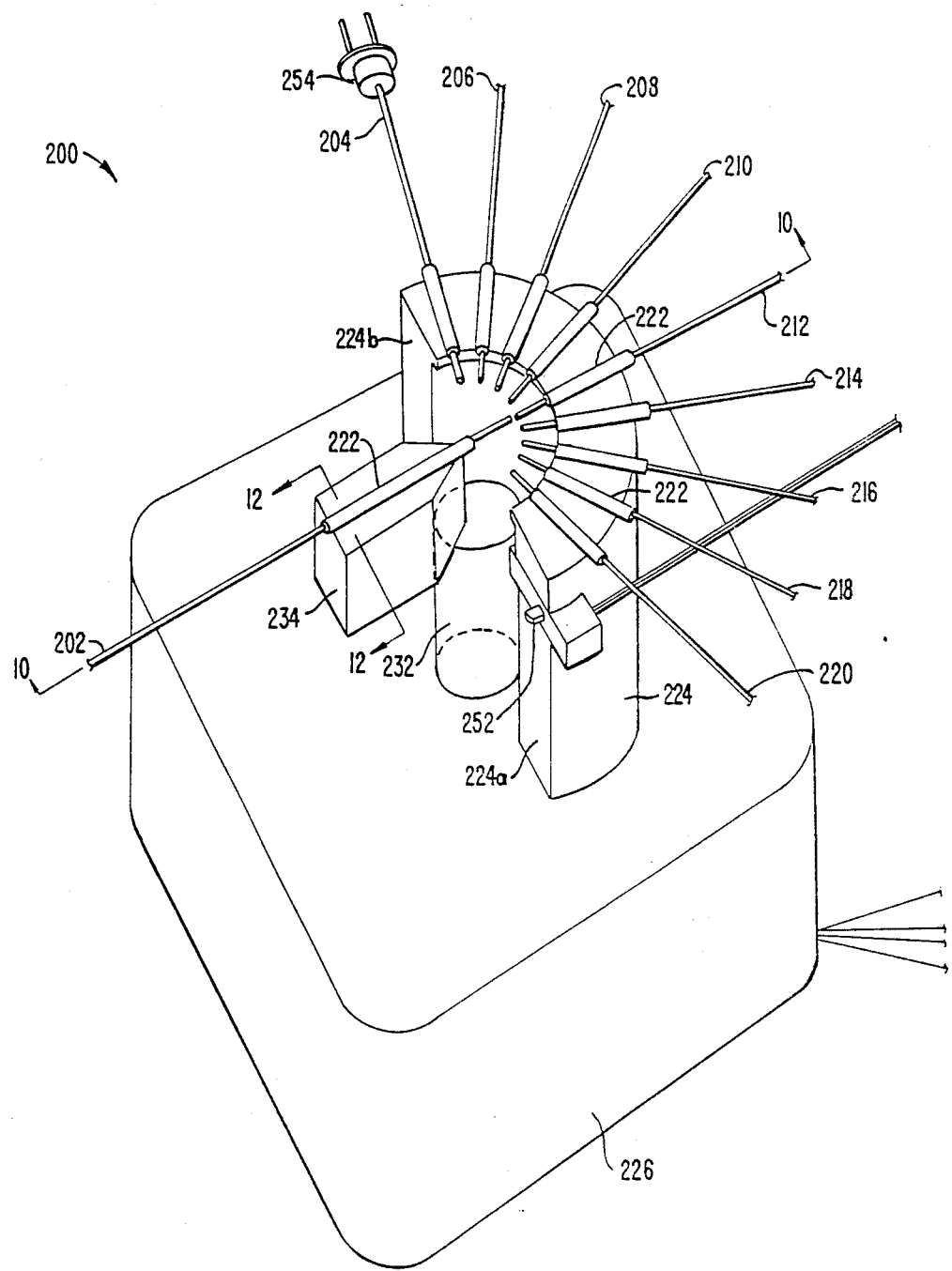
FIG._9.

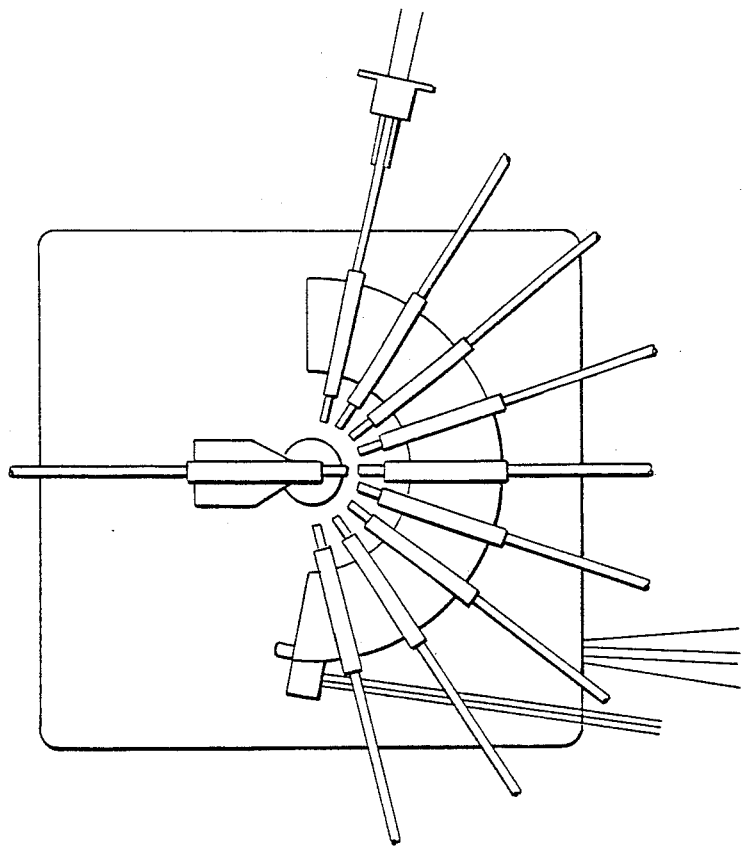
FIG._11.
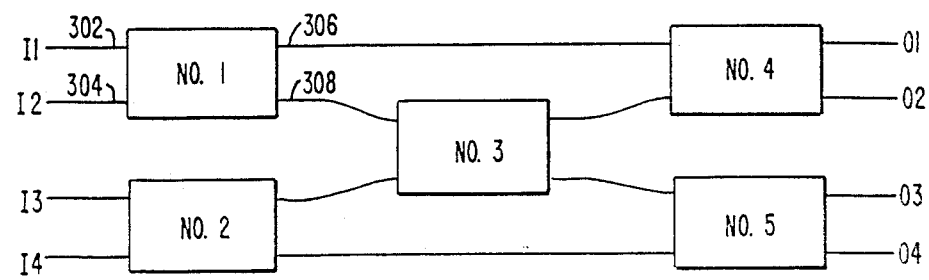
FIG._14.

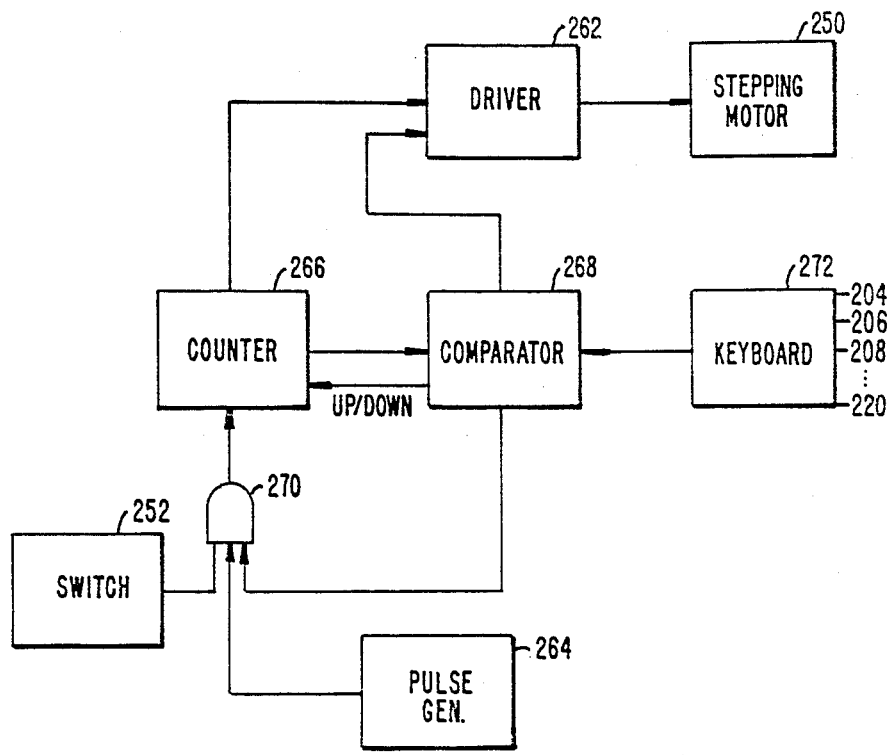
FIG._13.
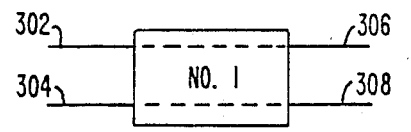
FIG._15A.
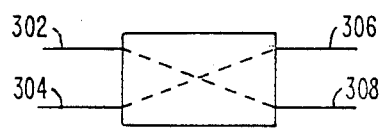
FIG._15B.

| SWITCHING MODE \ OUTPUT PORT | 01 | | | | | 02 | | | | | 03 | | | | | 04 | | | | |
|---|---|---|---|---|---|---|---|---|---|---|---|---|---|---|---|---|---|---|---|---|
| INPUT PORT | NO.1 | NO.2 | NO.3 | NO.4 | NO.5 | NO.1 | NO.2 | NO.3 | NO.4 | NO.5 | NO.1 | NO.2 | NO.3 | NO.4 | NO.5 | NO.1 | NO.2 | NO.3 | NO.4 | NO.5 |
| I1 | 0 | x | x | 0 | x | 0 | x | x | — | x | — | x | — | x | 0 | — | x | — | x | — |
| I2 | — | x | x | 0 | x | — | x | x | — | x | 0 | x | — | x | 0 | 0 | x | — | x | — |
| I3 | x | 0 | — | — | x | x | 0 | — | 0 | x | x | — | x | x | — | x | — | x | x | 0 |
| I4 | x | — | — | — | x | x | — | — | 0 | x | x | 0 | x | x | — | x | 0 | x | x | 0 |

0: NORMAL MODE
1: BYPASS MODE
X: NO PREFERENCE

FIG._16.

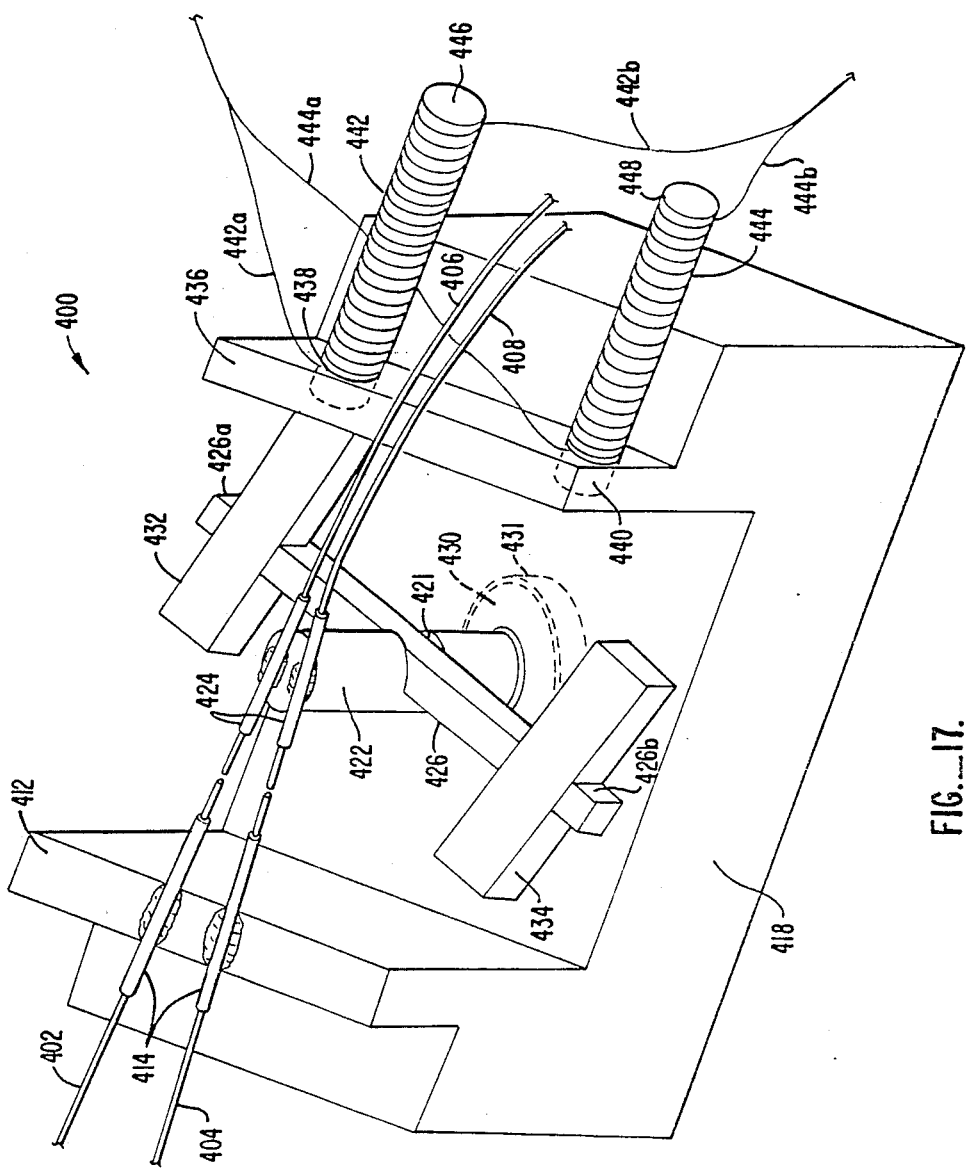
FIG._17.

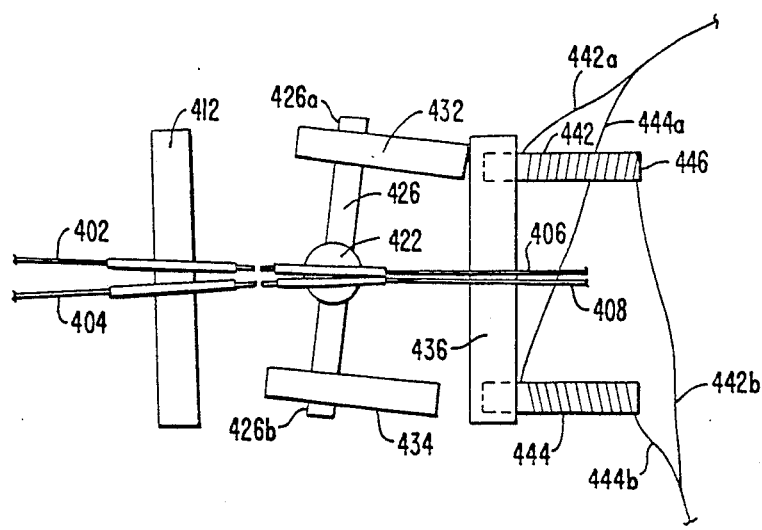
FIG._18A.
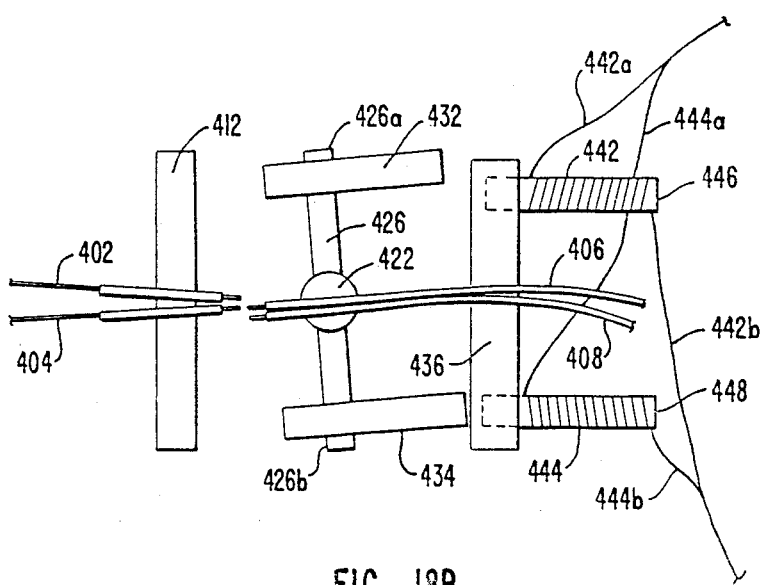
FIG._18B.

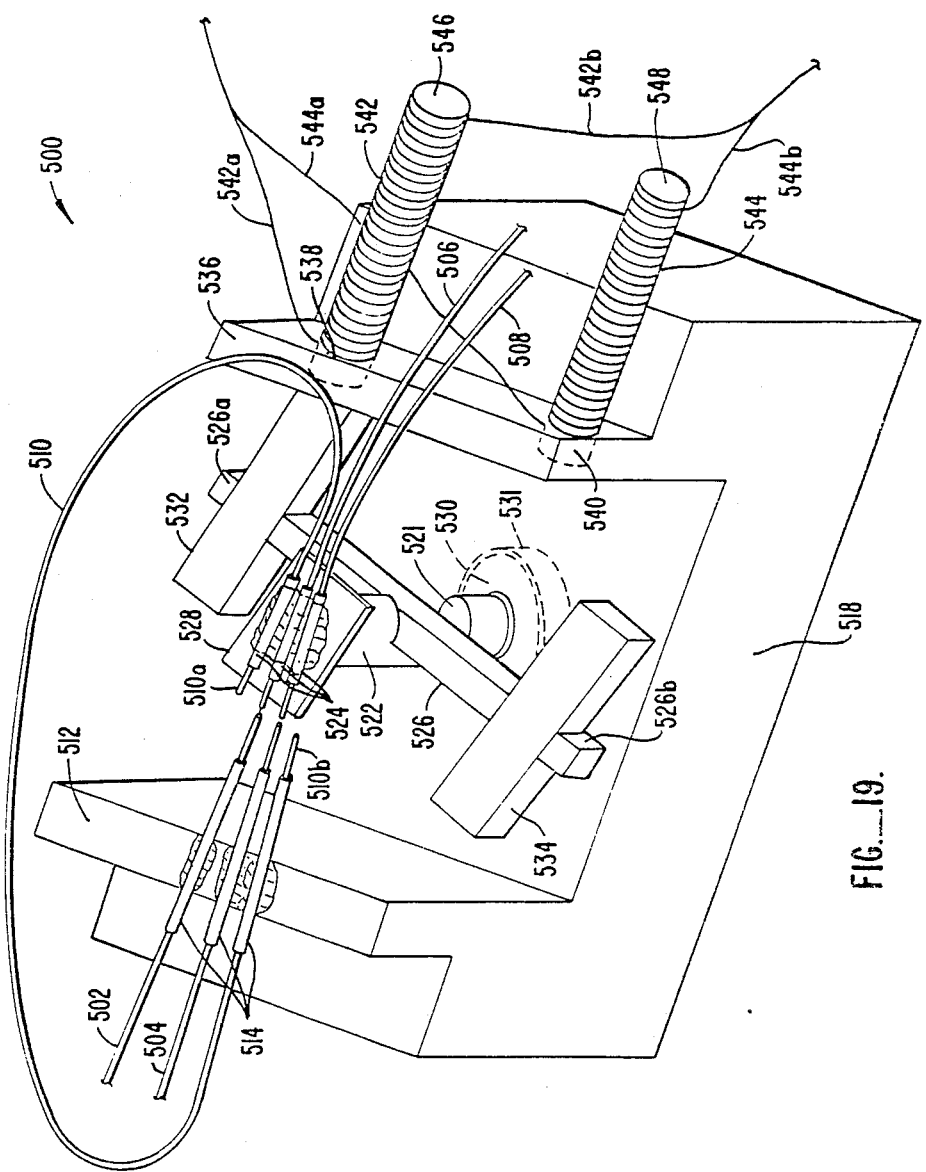
FIG._19.

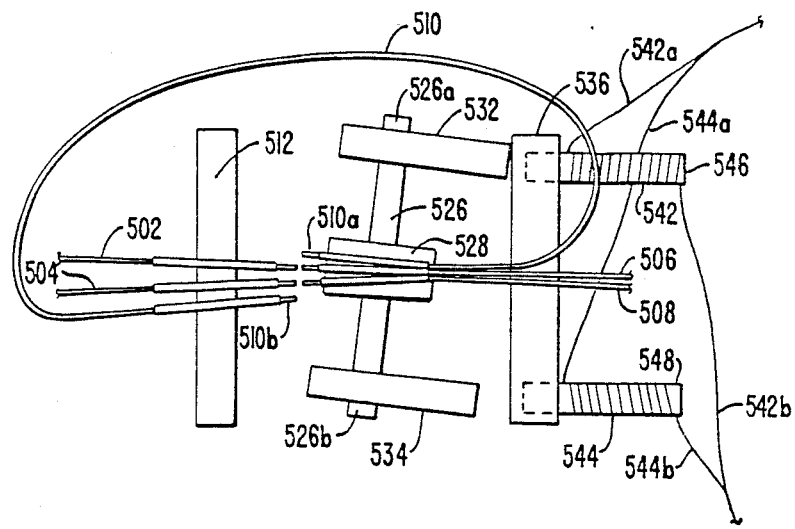
FIG._20A.
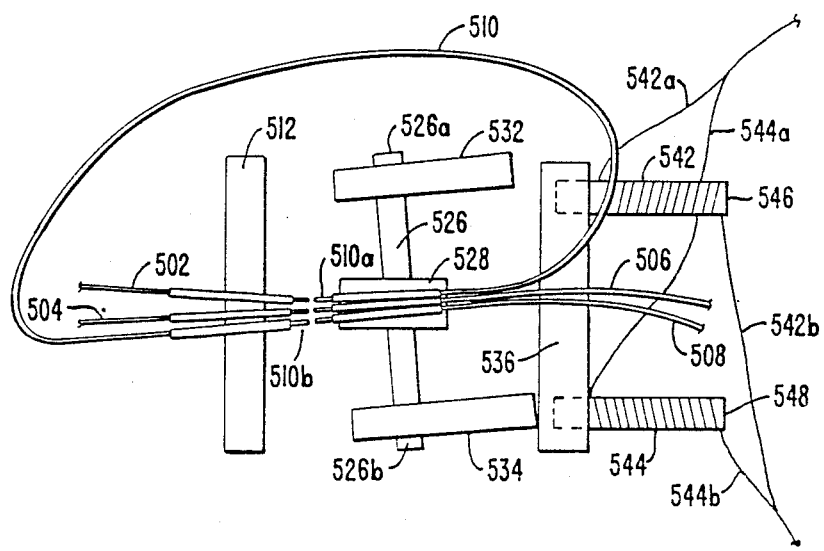
FIG._20B.

FIBER OPTIC SWITCH

CROSS-REFERENCE TO RELATED APPLICATION

This is a continuation of application Ser. No. 945,385, filed Dec. 22, 1986 (U.S. Pat. No. 4,834,488) which application is a continuation-in-part application of Ser. No. 785,166, filed Oct. 7, 1985, entitled "Fiberoptic Switch" (now abandoned).

BACKGROUND OF THE INVENTION

This invention relates to optical switches, and more specifically, to fiberoptic switches for switching optical paths defined by optical fibers.

With the advance of fiberoptic technology, information signals have been increasingly transmitted through optical fibers. Signal transmission through optical fibers has significant advantages over electrical transmission methods. Signals transmitted optically are not disturbed by electromagnetic noise. Use of optical fibers is advantageous in many environments where the use of metal electrical conductors is undesirable, such as in chemically active and corrosive environments.

As in electrical signal transmission, it is frequently necessary in optical signal transmission to change the transmission path of information signals by switches. In some applications, it is necessary to have the option of connecting one fiber with either one of two other fibers. In other applications, it may be necessary to exchange the connection between two input fibers and two output fibers. In still other applications, it may be necessary to select a connection between one fiber and a number of other fibers. Therefore, it is desirable to provide a wide variety of optical switches capable of performing different functions.

Two types of optic fibers have been used: multimode and single mode. While multimode fibers have good light-gathering ability, the wider diameter of the multimode fiber allows diverse internal zigzag paths which may cause mode dispersion. The mode dispersion caused limits the useful band width transmitted. With narrower diameters than the multimode fibers, single-mode fibers can transmit very wide band widths. Multimode fibers, however, are less disturbed by misalignment than single-mode fibers. Therefore, while a misalignment of a few microns may cause negligible transmission loss in multimode fibers, the same misalignment may cause irretrievable information loss when single-mode fibers are used. Therefore, one common problem of conventional optical switches is misalignment of the fibers connected by the switches. It is therefore desirable to provide fiberoptic switches which can accurately align input and output fibers. It is also desirable to provide fiberoptic switches that are inexpensive and easy to use.

One commonly used conventional optical switching method to select the connections between different optical fibers is disclosed by Aoyama in U.S. Pat. No. 4,239,331. The method selects the connection by moving a transparent dielectric plate between two switching positions: a first position where the plate is between input and output fibers of the switch, and a second position where the plate is not between the input and output fibers. When the plate is in the first position, the input fiber is connected with one of two output fibers. When the plate is moved to the second position, the input fiber is optically connected with the other output fiber. The plate is moved by means of an electromagnetic force.

In U.S. Pat. No. 4,322,126, Minowa et al. disclose a method similar to that disclosed by Aoyama to exchange the connection between two input fibers and two output fibers. Minowa et al. also disclose a switch which allows any one of four input fibers to be optically connected to any one of four output fibers by means of six dielectric light-transmitting members disposed between the four inputs and the four outputs. An electrically controlled mechanism is used to move the dielectric light-transmitting members.

Another type of conventional optical switch employs different mechanical arrangements where switching is accomplished by moving certain mechanical parts by means of electromagnetic forces. Thus, in U.S. Pat. No. 4,452,507, Winzer uses electromagnetic forces to move two movable fibers between two stoppers. When the two fibers are connected to one stopper, the two fibers are each optically connected to one of a pair of fixed fibers and when the two movable fibers are connected to the other stopper, one of the two movable fibers is not optically connected at all, and the other is connected to a different fixed fiber from before. A somewhat similar arrangement is disclosed in U.S. Pat. No. 4,220,396 to Antell. Antell proposes to move both pairs of fibers but the movements are in two perpendicular directions. The two pairs of fibers are also supported by two perpendicular surfaces. As in Winzer, one fiber in each of the two pairs is not optically connected in at least some switching positions.

In U.S. Pat. No. 4,189,206, Terai, et al. propose to move a moving fiber between two slots, each defined by the space between round positioning bars for selecting the optical connection with a pair of fixed fibers. The moving fiber is moved electromagnetically.

In U.S. Pat. No. 4,229,068, Hodge et al. propose to rotate a cylindrical member with respect to another cylindrical member in order to switch the optical connections between two sets of fibers supported by the two cylindrical members. Before the rotation, the two sets of fibers are optically connected in a particular arrangement. After the rotation, each fiber in the first set will be aligned with a different fiber in the second set than before the rotation.

Young, in U.S. Pat. No. 4,407,562, propose to switch the optical connections between the two sets of optical fibers, each set supported by the external surfaces of one of two housings. The translation of the external surface of one housing relative to that of the other alters the connections so that a fiber in the first set will be connected to a different fiber after the translational movement.

In an article entitled "Optical Fiber Switch Driven by PZT Bimorph" by Ohmori and Ogiwara, *Applied Optics*, Nov. 15, 1978, vol. 17, no. 22, pp. 3531–3532, the moving fiber is moved by means of a PZT bimorph between two stoppers to connect it with one of two fixed fibers.

In U.S. Pat. No. 4,146,856, Jaeschke proposes to select a connection between one moving fiber and two fixed fibers by means of an envelope which encloses the moving and fixed fibers and two reed members which act as support for the members. The surface of the envelope and the reed members serve the same function as the stoppers so that the moving fiber may be moved between two different positions to switch the optical path.

A purely mechanical switch is disclosed in U.S. Pat. No. 4,223,978 by Kummer, et al. A moving fiber may be connected with any one of four fixed fibers. The fibers are placed inside a tube, the interior cross-section of which has a number of corners. The fixed fibers are placed at the corners. The moving fiber may be connected with any one of the fixed fibers by bending the tube so that the end of the moving fiber is bent into the corner supporting the selected fixed fiber.

In the article "Moving Optical-Fiber Switch Experiment" by Yamamoto and Ogiwara, *Applied Optics*, Nov. 15, 1978, vol. 17, no. 22, pp. 3675–3678, a fiberoptic switch is proposed for connecting one moving fiber to one of a number of fixed fibers. The fixed fibers are each placed in a U-shaped groove on the surface of a supporting member. The moving fiber is placed in contact with the supporting member. The moving fiber approaches the plane of the U-shaped grooves supporting the fixed fibers at an angle so that the portion of the moving fiber adjacent to the fixed fibers is bent. The moving fiber is connected with a desired fixed fiber by moving the moving fiber over the surface of the supporting member until the end of the moving member falls into the same U-groove as the desired fixed member. A cam drive and a pulse motor are used to move the moving fiber. Since the moving fiber must be bent, the bending may damage the fiber. The cam drive and pulse motor are apparently used only for moving the moving fiber and not for positioning and aligning the moving fiber with a desired fixed fiber.

None of the above described fiber-optic switches are entirely satisfactory.

SUMMARY OF THE INVENTION

This invention is directed to optical switching devices which are inexpensive, easy to use and by which single mode as well as multimode fibers may be aligned accurately.

In accordance with one aspect of the invention, an optical switching device for switching two optical paths comprises a first and a second fixed fiber and a third and a fourth movable optical fiber. The third and fourth fibers are movable between two switching positions, so that when they are in one position the third and fourth fibers are substantially optically aligned with the first and second fibers respectively; when they are in the other switching position, the third and fourth fibers are substantially optically connected with the second and first fibers respectively. The device also comprises means for moving the third and fourth fibers between the two switching positions to switch the two optical paths.

In accordance with another aspect of the invention, another optical switching device comprises a first and a second fixed optical fiber, a rotatable member and a third and a fourth movable optical fiber attached to the member. The member is rotatable between two switching positions so that when the member is rotated to one position the third and fourth movable fibers are substantially optically aligned with the first and second fixed fibers respectively; when the member is rotated to the other switching position, the third movable fiber is substantially aligned with the second fixed fiber, and the fourth movable fiber is not aligned with the first fixed fiber. The device further comprises means for moving the rotatable member and the movable optical fiber between the two switching positions.

In accordance with still another aspect of the invention, an optical switching device comprises n fixed optical fibers, n being an integer greater than 1, where the n fibers are located so that one end of each fiber is optically aligned with a center point. The device further comprises an optical fiber rotatable about an axis through the center point, a stepping motor for rotating the rotatable member and a stepping motor control system for controlling the rotation of the stepping motor in order to align the rotatable fiber with any one of the n fixed fibers. The control system controls the stepping motor so that the movable fiber is rotated by one of n preset numbers of steps, each of the n numbers of steps corresponding to the position of a fixed fiber. Thus, when the rotatable fiber is rotated by a number of steps selected from the n number of steps, the movable fiber will be substantially optically aligned with the fixed fiber whose position corresponds to the selected number of steps.

BRIEF DESCRIPTION OF THE DRAWINGS

FIG. 1 is a perspective view of a fiberoptic switch for switching between two input optical fibers and two output optical fibers (2 by 2 system).

FIG. 2 is a cross-sectional view of the fiberoptic switch of FIG. 1 taken along the lines of 2—2 in FIG. 1, with the switch in one of two switching positions.

FIG. 3 is a cross-sectional view of the switch of FIG. 1 taken along the line 2—2 but where the switch is in the other of the two switching positions.

FIG. 4 is a cross-sectional view of the switch of FIG. 1 taken along the line 4—4 of FIG. 1.

FIG. 5 is a perspective view of a fiberoptic switch for optically aligning one optical fiber with one of a pair of optical fibers to illustrate the invention.

FIG. 6 is a cross-sectional view of the switch of FIG. 5 taken along the line 6—6 in FIG. 5.

FIG. 7 is a partially top view and a partially cross-sectional view of the switch of FIG. 5 illustrating the position of the switch components in one of two switching positions where one optical fiber is optically aligned with one of a pair of optical fibers.

FIG. 8 is a partially top view and partially cross-sectional view of the switch of FIG. 5 illustrating the switch components in the other of the two switching positions (different from that in FIG. 7) where the optical fiber is optically aligned with the other of the pair of optical fibers.

FIG. 9 is a perspective view of a fiberoptic switch for aligning a movable optical fiber with one of a number of fibers fixed in position.

FIG. 10 is a cross-sectional view of the switch of FIG. 9 taken along the line of 10—10 in FIG. 9.

FIG. 11 is a top view of the switch of FIG. 9 to illustrate the invention.

FIG. 12 is a cross-sectional view taken along the line 12—12 in FIG. 9.

FIG. 13 is a block diagram of a stepping motor control system for rotating and aligning the movable fiber with the fixed fibers.

FIG. 14 is a schematic view of a fiberoptic switch for switching the connections between four optical inputs I1, I2, I3 and I4, and four optical outputs O1, O2, O3 and O4, defining a 4 by 4 switch, using five 2 by 2 switches.

FIGS. 15A and 15B are schematic views of each of the five 2 by 2 switches in the 4 by 4 fiberoptic switch of FIG. 14, illustrating the two modes of each 2 by 2 switch: the normal and the bypass modes.

FIG. 16 illustrates the combinations of modes of the five switchers which enable the connection of any input to any output.

FIG. 17 is a perspective view of one other embodiment of fiberoptic switch for switching between two input optical fibers and two output optical fibers.

FIG. 18A is a partially top view of the switch of FIG. 17 illustrating the position of the switch components in one of two switching positions where one pair of input optical fibers are optically aligned with the other pair of output optical fibers.

FIG. 18B is a partially top view of the switch of FIG. 17 illustrating the switch configuration in the other of two switching positions (different from that in FIG. 18A) where only one of a pair of input optical fiber is aligned with one of a pair of output optical fibers, and the other of two input optical fibers is left open.

FIG. 19 is a perspective view of one other fiberoptic switch for reversibly interchanging two optical paths.

FIG. 20A is a partially top view of the switch of FIG. 19 illustrating the position of the switch components in one of two switching positions where two input optical fiber are directly aligned with two output optical fibers, and both fiber ends of the looping fiber are open.

FIG. 20B is a partially top view of the switch of FIG. 19 illustrating the position of the switch components in one of two switching positions where one of two input fibers is directly aligned with one of two output fibers, and the other input fiber is optically aligned to the other output fiber by means of a looping fiber.

DETAILED DESCRIPTION OF THE PREFERRED EMBODIMENT

FIG. 1 is a perspective view of a fiberoptic switch 20 for switching the optical connection between a pair of optical fibers 22, 24 and another pair of fibers 26, 28. Either pair may be the input or the output pair of fibers. Switch 20 is such that each fiber 22, 24 is always optically connected to one of the fibers 26, 28. As shown in FIG. 1, fibers 22 and 24 are fixed in position and fibers 26 and 28 may be moved between two switching positions. As shown in FIG. 1, fiber 22 is optically aligned with fiber 26 and fiber 24 with fiber 28. The positions of fibers 26, 28 as shown in FIG. 1 illustrate the positions in one switching position of switch 20. In the other switching position of switch 20 as shown in FIG. 3 below, the position of fibers 26 and 28 are exchanged so that fiber 22 will be optically aligned with fiber 28 and fiber 24 with fiber 26 instead. The manner in which switch 20 moves fibers 26, 28 between the two switching positions will be described below.

The two fixed fibers 22 and 24 are connected to a fixed support member 32. To protect the two fibers from being damaged, the two fibers 22 and 24 are first inserted into two sleeves 34 which are in turn attached by suitable means such as epoxy to support member 32. Support member 32 is mounted onto a base 38. Connected in such manner fibers 22 and 24 are fixed in position relative to member 38. Fibers 26, 28, however, are so connected to base member 38 that they are rotatable about an axis 40 (shown more clearly in FIGS. 2 and 3). Fibers 26 and 28 are inserted into hollow shaft 42 of a ball bearing 44 and a glue material such as epoxy is used to glue the fibers 26, 28 onto the inner surface of hollow shaft 42. Preferably fibers 26 and 28 are so glued to shaft 42 that they are symmetrically placed on two sides of axis 40 as shown in FIG. 2 to reduce strain on the fibers when they are rotated about axis 40. Bearing 44 is fitted snugly into a hole in base 38 as shown more clearly in FIG. 2.

Shaft 42 is inserted snugly into a support member 52. Support member 52 has an L-shaped support arm 54 which is also used to support fibers 26, 28 at a location preferably close to fibers 22, 24 to improve the accuracy of alignment. Fibers 26 and 28 are again inserted in protective tubing segments 34 and the two segments are in turn glued onto arm 54. The positions where fibers 22, 24, 26 and 28 are glued onto support members 32 and 52 are preferably chosen such that all four fibers are substantially equidistant from axis 40 and that in either one of two switching positions, each of fibers 22, 24 is accurately aligned with one of fibers 26, 28.

Support member 52 is also connected to a permanent magnet 56. In one embodiment, one end of support member 52 is U-shaped so that magnet 56 may be securely connected to it by being inserted and fitting snugly into the U-shaped end. Support member 32 has two arms 62 and 64. While in FIG. 1, arms 54, 62, 64 are shown as substantially L-shaped, it will be obvious that support arms of other shapes may also be used and are within the scope of this invention. Two stoppers, 66 and 68 are attached to arms 62 and 64, respectively. Arms 62, 64 and stoppers 66 and 68 are so positioned and dimensioned that, when support member 52 is rotated about axis 40 until magnet 56 contacts stopper 68 (which is the position of support member 52 shown in FIG. 1) fiber 22 is accurately aligned with fiber 26 and fiber 24 is accurately aligned with fiber 28, and when support member 52 and fibers 26 and 28 are rotated about axis 40 until magnet 56 contacts stopper 66, fiber 22 will be accurately aligned with fiber 28 and fiber 24 will be accurately aligned with fiber 26. Therefore, with the positions of the various support members defined above, switch 20 is in a first switching position when magnet 56 contacts stopper 68 and is in the second switching position when magnet 56 contacts stopper 66.

Arms 62 and 64 are preferably made from a ferromagnetic material. Coils 72 and 74 are wound onto arms 62 and 64, respectively in the same direction. Coil 72 has ends 72a and 72b and coil 74 has ends 74a and 74b. In order to rotate member 52 from the first switching position as shown in FIGS. 1 and 2 to the second switching position as shown in FIG. 3, a pulse current is passed through coil 74 in such manner that a magnetic field is generated to repel magnet 56 away from stopper 68. The pulse current is of such magnitude that the repulsive force is strong enough to rotate support member 52 about axis 40 until magnet 56 contacts stopper 66. Since arm 72 is made from a ferromagnetic material, a magnetic field is induced therein by magnet 56 so that the attractive magnetic force between magnet 56 and arm 72 will keep fibers 26 and 28 in position and substantially in alignment with fibers 24, 22 respectively. Similarly, when it is desired to rotate member 52 from the second switching position as shown in FIG. 3 to the first switching position as shown in FIGS. 1 and 2, a pulse current is passed through coil 72 in such manner that a repulsive magnetic force is generated to repel magnet 56 and support member 52 away from stopper 56 and towards stopper 68.

As magnet 56 approaches stopper 66 when switching from the first to the second switching position, it may be desirable to apply a current to coil 72 so that magnet 56 is attracted towards stopper 66. This will cause magnet 56 and member 52 to move towards stopper 66 at a faster speed. To generate such attractive magnetic force, the same pulse current applied to coil 74 may be applied to coil 72 but in the opposite direction. Thus, if the current is applied so that the current passes from end 74a to end 74b the current applied to coil 72 should pass from end 72b to end 72a. When switch 20 is switching from the second position to the first an additional current may also be applied to coil 74 in addition to the one applied to coil 72 to increase the speed of switching. Instead of changing the direction of the current so that the same current may be used for both coils, it is possible to pass the current pulses in the same direction for the two coils but use two currents of opposite polarity. All such configurations are within the scope of the invention.

While the two switching positions are defined by the two support members 52, 32, with the shapes shown in FIG. 1 and exchange of positions between the fibers accomplished by rotation using electromagnetic forces, it will be obvious that other manners of defining the two switching positions and other modes of movement of the two fibers such as translational movement may also be used. Evidently, forces other than that of the electromagnetic type may also be used. All such configurations are within the scope of the invention.

FIG. 5 is a perspective view of a fiberoptic switch for optically connecting a movable optical fiber to one of a pair of fixed fibers so that in one switching position it is connected to one fixed fiber and in the other switching position it is connected to the other fixed fiber. As shown in FIG. 5, switch 100 is for connecting movable fiber 102 to one of a pair of fixed fibers 104, 106. Fibers 104 and 106 are supported by support member 108 attached to a base member 110. As in the device of FIG. 1, fibers 104 and 106 are inserted into tubing segments 112 which are attached to support member 108 by a glue such as epoxy. In such manner fibers 104 and 106 are fixed relative to base 110. Fiber 102 is connected to base 110 in a manner such that it is rotatable relative to base member 110. In one embodiment, fiber 102 is threaded through a tubing segment 112 which is glued on to a rotatable member 120. Member 120 is of such dimensions that it fits snugly into hollow shaft 122 of a bearing 124. Bearing 124 is inserted into a hole in base 110 in a manner also similar to that shown in FIG. 2. Connected in such manner, fiber 102 is rotatable about axis of the bearing 124 between different switching positions.

Also attached to rotatable member 120 is a bar 126. Support member 108 has two arms 108a and 108b extending towards bar 126. Arms 108a and 108b extend to such distance from bar 126 that when bar 126 is rotated until it contacts arms 108a, fiber 102 is substantially aligned with fiber 106, and when bar 126 is rotated towards arm 108b until they contact, fiber 102 is substantially optically aligned with fiber 104. Thus, the relative positions of rotatable member 120, bar 126 and arms 108a, 108b define the two switching positions, the first switching position being the position where bar 126 contacts arm 108a and the second switching position being where bar 126 contacts arm 108b.

In order to rotate the rotatable member 120 between the two switching positions an electromagnetic relay 130 is utilized. One suitable relay for relay 130 is Model DS2-M-5 volt from Aromat, which is available from Patane Santa Clara, Santa Clara, Calif. The action of the relay is shown more clearly in reference to FIGS. 7 and 8. When current is passed through the relay in the direction shown in FIG. 7, the armature 132 of the relay is in the position as shown in FIG. 7. When no current is passed through the relay the armature 132 is in the position shown in FIG. 8. Armature 132 is connected to rotatable 120 by spring 134. Thus, when armature 132 is in its position as shown in FIG. 7, it moves spring 134 which in turn causes member 120 to rotate bar 126 towards support 108 until it contacts arm 108b so that switch 20 is in its first switching position.

When no current is passed to relay 130, armature 132 is in the position shown in FIG. 8. Armature 132 rotates causing bar 126 to be rotated towards arm 108a until they contact. In such manner switch 20 is switched to its second switching position. The use of spring 134 to connect armature 132 and member 120 decreases vibratory motions which might cause misalignment of the fibers. Spring 134 reduces the need for close tolerances in the connection between armature 132 and rotatable member 120 so that switch 20 is inexpensive and easy to use.

FIG. 9 is a perspective view of yet another fiberoptic switch to illustrate the invention. As shown in FIG. 9 switch 200 is capable of connecting fiber 202 to any one of 9 fibers 204–220. As will be obvious from the discussion below, fiber 202 may be optically aligned with any number of fibers which may be greater than or less than 9. Such configurations are within the scope of the invention. As before, the 9 fibers are inserted in tubing segments 222 which are glued on to a support member 224. Support member 224 is in turn attached to base member 226. In such manner the 9 fibers are fixed in position relative to base 226. As in the switch of FIG. 5, fiber 202 is connected to rotatable member 232 through a stopper 234. Member 232 is connected to base 226 through a bearing as shown in FIG. 10 in a manner similar to that of the switches of FIGS. 2 and 6.

Support member 224 is preferably annular in shape with sides 224a and 224b acting as stoppers. Fibers 204 and 220 are positioned such that when stopper 234 is rotated until it contacts surface 224a, fiber 202 is substantially aligned with fiber 204, and when stopper 234 is rotated until it contacts surface 224b, fiber 202 is substantially aligned with fiber 220. In order to align fiber 202 with any one of the remaining 7 fibers 206–218, a stepping motor 250 contained within the base 226 is used. As shown in FIG. 10, rotatable member 232 is mounted onto the shaft 242 of a bearing 244. Shaft 242 of the bearing, however, may be rotated by a stepping motor 250. The stepping motor used may be any one of a number of conventional stepping motors. A suitable stepping motor may for example be model PH 265-02 and PH 265-02B provided by Oriental Motor of Co., Ltd. of Tokyo, Japan. The stepping motor 250 rotates shaft 242 by full steps or half steps of given angles. In PH 265-02 type motor provided by Oriental motor for example, it rotates a shaft by a full step of 1.8 degrees or a half step of 0.9 degrees. Thus, by spacing the 9 fibers 204–220 at angular distances from one another that fiber 202 may be aligned with any one of the 9 fibers by rotating shaft 242 by given number of steps or half steps. Thus, in one practical embodiment any two adjacent fibers among the 9 fibers may be spaced apart by 18 degrees. Thus, if fiber 202 is aligned with any one of the 9 fibers such as fiber 212, rotating shaft 242 by 20 half steps or 10 full steps will cause fiber 202 to be aligned with fiber 210 or fiber 214. Switch 252 is provided on surface 224a so that when stopper 234 hits the switch, switch 252 will switch off the stepping motor 250 to prevent any further turning of shaft 242 which may damage the switch 200. Another switch similar to switch 252 may be provided on surface 224b so that when stopper 234 hits surface 224b, such switch (referred to below also as switch 252) will switch off the stepping motor 250 to prevent damage to switch 200.

FIG. 13 is a block diagram of a stepping motor control system for rotating the fiber 202 with the fixed fibers. Stepper motor 250 is controlled by the control system of FIG. 13 so that alignment of movable fiber 202 with any one of the nine fixed fibers may be selected. As shown in FIG. 13, stepping motor 250 is driven by driver 262 which causes the stepping motor to rotate shaft 242 a step or a half-step on receipt of a pulse from pulse generator 264. The selection of rotation by a step or a half-step may be performed in a conventional manner. The supply of pulses from pulse generator 264 to driver 262 is controlled by switch 252, counter 266, comparator 268, AND-gate 270 and keyboard 272.

Keyboard 272 ha a number of input keys corresponding to fibers 204–220. To cause fiber 202 to be aligned with any one of the nine fixed fibers, the user simply presses the input key corresponding to such fixed fiber. The circuit of FIG. 13 causes the stepping motor to rotate the fiber 202 by the required number of steps or half-steps so that fiber 202 is aligned with the desired fixed fiber corresponding to the input key pressed.

The nine fibers are placed apart at such angles that fiber 202 may be rotated from a position in alignment with one fixed fiber to a position in alignment with another fixed fiber by the stepping motor. In other words, the angle between any two fixed fibers must be an integral multiple of the angle rotated by the stepping motor in a step or half-step. In one practical embodiment, the nine fibers are placed so that 20 half-steps are required for stepping motor 250 to move fiber 202 from a position in alignment with one of the nine fibers to a position in alignment with an adjacent fiber. To keep tract of the position of the fixed fibers, 0 may be designated as the position of fixed fiber 204. Hence 20 steps will be required to rotate fiber 202 from a position in alignment with fiber 204 to one in alignment with fiber 206, and 40 steps will be required to rotate fiber 202 from a position in alignment with fiber 204 to one in alignment with fiber 208. Therefore, if, in the initial position, fiber 202 is in alignment with fiber 204, the numbers of steps required for stepping motor 250 to align fiber 202 with any one of the fibers 204–220 are as follows:

| Fiber | Half-Steps Required |
| --- | --- |
| 204 | 0 |
| 206 | 20 |
| 208 | 40 |
| 210 | 60 |
| 212 | 80 |
| 214 | 100 |
| 216 | 120 |
| 218 | 140 |
| 220 | 160 |

However, if the initial position is such that fiber 202 is not in alignment with fiber 204, but in alignment with one of the remaining eight fibers, the number of half-steps required to rotate fiber 202 to a new position in alignment with the desired fixed fiber is given by the difference between the two numbers of half-steps in the above table corresponding to the two fibers. For example, if initially fiber 202 is in alignment with fiber 208, and it is desired now to align fiber 202 with fiber 214 instead, then the number of half-steps required to rotate fiber 202 to accomplish such result is given by the difference between the half-step number for fiber 214 (100) and that for fiber 208 (40) or 60.

Comparator 268 is capable of storing the number in the above table corresponding to the fixed fiber which fiber 202 is presently aligned with. When comparator receives an input number from keyboard 274, it compares the input number to the number stored. Such input number may be greater or less than the stored number. Whether one is greater than or less than the other will determine which direction the stepping motor should rotate the fiber 202. Thus if fiber 202 is presently aligned with fiber 212, the number stored in the comparator will be 80. If the user pressed the key for fiber 206, the input number will be 20, which means the stored number is greater than the input number. Comparator 268 sends this information to driver 262, causing the driver to cause stepping motor to rotate fiber 202 towards fiber 206.

Counter 266 provides its count to comparator 68 to increase or decrease the stored number in order to reduce the difference between the stored number and the input number. In the example of the paragraph above, the stored number would be decremented by 1 to 79. If the new stored number is not the same as the input number, comparator 268 provides a high output to an input of AND-gate 270. Switch 252 will provide a high output unless it is in contact with stopper 234 in reference to FIG. 9. Therefore, assuming that stopper 234 is not in contact with the switch 252, the input of AND-gate 270 from switch 252 will be high. Hence, when pulse generator 264 generates a pulse at a time when stopper 234 is not in contact with switch 252 and when the two numbers compared in comparator 268 are not the same, AND-gate 270 will pass the pulse from pulse generator 264 to counter 266 and to driver 262 causing stepping motor 250 to move a step in the direction indicated by the control signal from comparator 268.

When stopper 234 is in contact with switch 252, the output of the switch turns low, thereby stopping all pulses from pulse generator 264 to driver 262, thereby stopping the stopping motor 250.

If comparator 268 detects that the new stored number is equal to the input number, the output of comparator 268 becomes low, thereby stopping all pulses from pulse generator 264 to driver 262, also turning off the stepping motor. Again using the example of the paragraphs immediately above, when the new stored number is 20, the output of comparator 268 becomes low, turning off the stepping motor. At such point, the driver will have caused the stepping motor to rotate by 60 steps, causing fiber 202 to be aligned with fiber 206. The new stored number is 20, corresponding to the position of fixed fiber 206 in the table above which fiber 202 is presently aligned with.

Upon initialization of switch 200 fiber 202 is always initially aligned with fiber 204. Comparator 268, upon initialization, will always store the number corresponding to fiber 204, namely 0. One of the nine input keys to keyboard 272 is then pressed to select a desired fixed fiber with which fiber 202 is to be aligned. Such number is fed to comparator 268 where such number is compared to 0, the position of fiber 204. The comparator 268 may be one of a number of conventional comparators. One comparator chip which may be suitable is TTL 7485. Photodetector 254 is connected to fiber 204. Using photodetector 254, the position of fiber 202 can be periodically adjusted to accurately align fibers 202 and 204.

From the above, it will be evident that fiber 202 may be rotated from a position in alignment with one of the fixed fibers to one in alignment with any other fixed fiber. While nine fibers spaced apart at equal angular distances have been used to illustrate the invention, it will be obvious that the invention is equally applicable where a different number of fixed fibers is used which are spaced apart at unequal angular distances so long as the angular distances are integral multiples of the angle rotated by the stepping motor in a step or half-step. All such configurations are within the scope of the invention. It will be evident that the embodiment described immediately above has the advantage that, except for the two end positions, the positions of the movable fiber are determined by the steps of the stepping motor instead of mechanical means such as notches or stoppers. Hence, most of the alignment positions of the movable fiber may be changed if desired without having to change any mechanical parts, which may be advantageous for some applications. Furthermore, since the accuracy of angular displacement achievable using stepping motors is high, the fiber can be accurately aligned with another fiber.

FIG. 14 is a schematic view of a fiberoptic switch for switching the connections between four optical inputs I1, I2, I3 and I4, and four optical outputs O1, O2, O3 and O4. Five optical switches No. 1, No. 2, No. 3, No. 4 and No. 5 are disposed in a manner shown in FIG. 14 to enable any one of the four inputs to be optically connected to any one of the four outputs. The five switches are each of the type with two fixed inputs and with two movable outputs whose positions may be interchanged. Consider switch No. 1, for example. Its inputs 302 and 304 are connected to inputs I1 and I2, respectively. These two input connections are fixed and are not changed in the switching. The two outputs 306 and 308, however, may be switched between two switching positions. In one switching position, output 306 is connected optically with input 302, and output 308 is connected optically to input 304. In the other switching position outputs 306 and 308 are interchanged so that output 306 and 308 are optically connected with inputs 304 and 302, respectively. Thus, in the first switching position, input I1 is connected through switch No. 1 to output 306 and then through switch No. 4 to output O1. If switch No. 1 is in the second switching position, however, input I1 is connected through switch No. 1 to output 308 and to switch No. 3 instead. The two outputs of switch No. 3 may again be switched between two positions causing the output 308 to be connected to either switch No. 4 or switch No. 5. The outputs of switches No. 4 and No. 5 may each be switched between two switching positions.

The two switching positions of switch No. 1 are illustrated schematically in FIGS. 15A and 15B. In the switching position of FIG. 15A where inputs 302 and 304 are connected optically to outputs 306 and 308, respectively, such switching position of switch No. 1 may be referred to as the normal mode of the switch. In the other switching position of FIG. 15B, inputs 302 and 304 are optically connected to outputs 308 and 306, respectively, defining a bypass mode. By choosing the proper modes for the five switchers, any one of the inputs I1-I4 may be connected optically to any one of the outputs O1-O4.

FIG. 16 illustrates the combinations of modes of the five switchers which enable the connection of any input to any output. Thus, if input I2 is to be connected to output O3, switches No. 1 and No. 5 should be in the normal mode and switch No. 3 should be in the bypass mode. Switches Nos. 2 and 4 may be in any mode. Thus, the four inputs may be connected to the four inputs in any manner consistent with the pattern in FIG. 16.

FIG. 17 is a perspective view of one other embodiment of fiberoptic switch 400 for switching the optical connection between a pair of optical fibers 402, 404 and another pair of fibers 406, 408. Switch 400 is designed such that in one position as shown in FIGS. 17 and 18A, fiber 402 is optically connected to fiber 406, and fiber 404 is optically connected to fiber 408, and in the other position as shown in FIG. 18B, fiber 404 is connected to 406 and the other two fiber 402 and 408 are left optically open. As shown in FIG. 17 fiber 402 and 404 are fixed in position and fibers 406 and 408 may be moved between two switching positions. The manner in which switch 400 moves fibers 406, 408 between the two switching positions will be described below.

The two fixed fibers 402 and 404 are attached to a fixed support member 412. To protect the two fibers from being damaged, the two fibers 402 and 404 are first inserted into two sleeves 414 which are in turn attached by suitable means such as epoxy to support member 412. Support member 412 is connected onto a base 418. Connected in such manner fibers 402 and 404 are fixed in position relative to base 418. Fibers 406, 408, however, are so oriented to base member 418 that they are rotatable between two positions (shown more clearly in FIGS. 18A and 18B). Fibers 406, 408 are first inserted into two sleeves 424 for protection, and are then mounted on the top of a rotary pin 422 by a glue material such as epoxy. The rotary pin 422 is snugly inserted into a ball bearing 430. The ball bearing 430 is then fitted snugly into a hole 431 in base 418.

Arm 426 is preferably installed in the middle into a slot 421 of the rotary pin 422. Both ends 426a, 426b of the arm 426 are U-shaped so that permanent magnets 432 and 434 may be securely mounted to two ends, respectively. A stopper plate 436 is connected to the base 418. Two coils 442, 444 are wound onto two bars or rods 446 and 448, respectively, in the same direction. Rods 446, 448 are preferably made from a ferromagnetic material. Coil 442 has ends 442a and 442b and coil 444 has ends 444a and 444b. End 442a is electrically connected to end 444a and end 442b is electrically connected to end 444b. Rods 446 and 448 are snugly mounted into two holes 438 and 440 of stopper plate 436, respectively.

In one embodiment, magnetization strength of magnet 432 is selected to be stronger than that of magnet 434 by an amount such that magnet 432 is biased to be attracted to rod 446, which is made from a ferromagnetic material, as shown in FIGS. 17 and 18A as the current is turned off in coils 442 and 444. As magnet 432 contacts stopper plate 436, fiber 402 is optically aligned with fiber 406 and fiber 404 is optically aligned with 408. In order to rotate arm 426 from the first switching position as shown in FIGS. 17 and 18A to the second switching position as shown in FIG. 18B, a constant current is passed through coils 442 and 444 in such manner that a magnetic field is generated by coil 442 to repel magnet 432 away from the stopper plate 436 and the other magnetic field generated by coil 444 to attract magnet 434 towards the stopper plate 436. Arm 426, magnets 432, 434, and stopper plate 436 are so positioned and dimensioned that, when the rotary pin 422 is rotated relative to base 418 until magnet 434 contacts stopper plate 436, fiber 406 is accurately aligned with fiber 404 and the other two fibers 402 and 404 are left optically open as shown in FIG. 18B. The constant current is of such magnitude that the torque produced by the repulsive force between magnet 432 and rod 446, and the attractive force between magnet 434 and rod 448 is strong enough to rotate the rotary pin 422. Since the constant current is maintained, the switch 400 will remain in the position as shown in FIG. 18B. As the current is turned off, the switch 400 will return to the position one as shown in FIGS. 17 and 18A. Since the magnetization strength of magnet 432 is stronger than that of magnet 434 and since the two rods 446 and 444 are made from a ferromagnetic material, the magnetic attractive force between magnet 432 and rod 446 is greater than that between magnet 434 and rod 448 by such amount that switch 400 will return to the position shown in FIGS. 17, 18A. Thus, even if there is a power failure, the switch will return to and remain in a known state and the switch is fail-safe in regard to power failures. In prior art switches using mechanical springs to return the switch to a known state during power failures, at least about 30 milliseconds are required, since the springs will cause a certain amount of bouncing. In contrast, switch 400 will return to the position of FIGS. 17, 18A in a much shorter time period during a power failure.

In yet another embodiment, two permanent magnets 432 and 434 are selected in such manner that they preferably have the same strength of magnetization. In order to rotate arm 426 from the first position as shown in FIG. 17 and 18A to the second switching position as shown in FIG. 18B, a constant current is passed through coils 442 and 444 in such directions that magnet 432 is repelled away from the stopper plate 436 by a magnetic field induced by coil 442 and magnet 434 is attracted toward the stopper plate 436 by a magnetic field induced by coil 444. As the rotary pin 422 is rotated until magnet 434 contacts stopper plate 436, fiber 406 is accurately aligned with fiber 404 and the other two fibers 402 and 422 are left optically open as shown in FIGS. 18B. Alternatively, when it is desired to rotate arm 426 from the second switching position as shown in FIG. 18B to the first switching position as shown in FIGS. 17 and 18A, a constant current in different polarity is passed through coils 442 and 444 such that a repulsive magnetic force is generated to repel magnet 434 away from stopper plate 436 and an attractive magnetic force is generated to move magnet 432 toward stopper plate 436. As magnet 432 contacts stopper plate 436, fiber 406 is accurately aligned to fiber 402 and fiber 408 is accurately aligned with fiber 404. In the above description, a constant current is used; it will be understood that a current pulse may be used instead provided the repulsive and attractive forces generated thereby are adequate to cause switch 400 to be switched from one position to the other.

FIG. 19 is a perspective view of one other fiberoptic switch 500 for reversibly interchanging two optical paths. Switch 500 is designed such that each of two fibers 502 and 504 is always optically connected to one of the two fibers 506 and 508. In one position as shown in FIGS. 19 and 20A, fiber 502 is optically aligned with fiber 506, and fiber 504 optically aligned with fiber 508; two fiber ends 510a, 510b of a looping fiber 510 are left optically open. In the other position as shown in FIG. 20B, fiber 504 is optically aligned with fiber 506, fiber 502 optically aligned with fiber end 510a, and fiber 508 optically aligned with fiber end 510b. This causes fiber 502 to be optically connected to fiber 508 through the looping fiber 510. As shown in FIG. 19, fibers 502, 504 and fiber end 510b are fixed in position and fibers 506, 508 and fiber end 510a may be moved between two switching positions. The manner in which switch 500 between the two switching positions will be described below.

In reference to FIG. 19, the two fibers 502, 504 and fiber end 510b are fixed on a fixed support member 512. To protect these three fibers from being damaged, the two fibers 502, 504 and fiber end 510b are first inserted into three sleeves 514 which are in turn attached by suitable means such as epoxy to support member 512. Support member 512 is connected onto a base 518. Connected in such manner fibers 502, 504 and fiber end 510b are fixed in position relative to base 518. Fibers 506, 508 and 510a, however, are so oriented to base 518 that they are rotatable between two positions (shown more clearly in FIGS. 20A and 20B). An alignment plate 528 is mounted on the top of the rotary pin 522. Fibers 506, 508 and fiber end 510a are first inserted into three sleeves 524 for protection, and the sleeves are then attached onto alignment plate 528 by a glue material such as epoxy. The rotary pin 522 is snugly inserted into a ball bearing 530. The ball bearing 530 is then fitted snugly to a hole 531 in the base 518.

Arm 526 is preferably installed in the middle into a slot 521 of the rotary pin 522. Both ends 526a, 526b of the arm 526 are U-shaped so that permanent magnets 532 and 534 may be securely mounted to the two ends 526a and 526b, respectively. A stopper plate 536 is connected to the base 518. Two coils 542, 544 are wound onto two bars or rods 546 and 548, respectively, in the same direction. Rods 546, 548 are preferably made from a ferromagnetic material. Coil 542 has ends 542a and 542b and coil 544 has ends 544a and end 542b. End 542a is electrically connected to end 544a and end 542b is electrically connected to end 544b. Rods 546 and 548 are snugly mounted into two holes 538 and 540 of stopper plate 536, respectively.

In one embodiment, magnetization strength of magnet 532 is selected to be stronger than that of magnet 534 by such amount that magnet 532 is attracted to rod 546, which is made from a ferromagnetic material, when no current is flowing in coils 542 and 544. The relative locations of the components of switch 500 in such position are illustrated in FIGS. 19, 20A. In such position, magnet 32 is in contact with stopper plate 536; fiber 502 is optically aligned with fiber 506, fiber 504 optically aligned with fiber 508, and two fiber ends 510a, 510b of a looping fiber 510 are left optically open. In order to rotate arm 526 from the first switching position as shown in FIG. 19 and 20A to second switching position as shown in FIG. 20B, a constant current is passed through coils 542 and 544 in such manner that a magnetic field is generated by coil 542 to repel magnet 532 away from the stopper plate 536 and the magnetic field generated by coil 544 attracts magnet 534 towards the stopper plate 536. Arm 526, magnets 532, 534, and stopper plate 536 are so positioned and dimensioned that, when the rotary pin 522 is rotated relative to base 518 until magnet 534 contacts stopper plate 536, fiber 506 is accurately aligned with fiber 504, fiber 502 accurately aligned with fiber end 510a and fiber 508 is accurately aligned with fiber end 510b, such that fiber 502 is optically connected to fiber 508 through looping fiber 510 as shown in FIG. 20B. The constant current is of such magnitude that the torque induced by the repulsive force between magnet 532 and rod 546, and the attractive force between magnet 534 and rod 548 are strong enough to rotate the rotary pin 522. Since the constant current is maintained, the switch 500 will keep in the position as shown in FIG. 20B. As the current is turned off, coils 542, 544 will exert no electromagnetic forces on the magnets 532, 534. Since the magnetization strength of magnet 532 is stronger than that of magnet 534, the attractive magnetic force between magnet 532 and ferromagnetic rod 546 will be greater than that between magnet 534 and ferromagnetic rod 548; the difference is of such magnitude that it causes the switch 500 to return to the position as shown in FIGS. 19 and 20A. Thus, even if there is a power failure, the switch will return to and remain in a known state and the switch is fail-safe in regard to power failures. In prior art switches using mechanical springs to return the switch to a known state during power failures, at least about 30 milliseconds are required, since the springs will cause a certain amount of bouncing. In contrast, switch 500 will return to the position of FIGS. 19, 20A in a much shorter time period during a power failure.

In still another embodiment, two magnets 532 and 534 are selected in such manner that they preferably have the same strength of magnetization. In order to rotate arm 526 from the first position as shown in FIGS. 19 and 20A to the second switching position as shown in FIG. 20B, a constant current is passed through coils 542 and 544 in such manner that magnet 532 is repelled away from the stopper plate 536 by a magnetic field induced by coil 542 and magnet 534 is attracted toward the stopper plate 536 by a magnetic field induced by coil 544. As the rotary pin 522 is rotated until magnet 534 contacts stopper plate 536, fiber 504 is accurately aligned with fiber 506, and fiber 502 accurately aligned with fiber end 510a and fiber 508 is accurately aligned with fiber end 510b such that fiber 502 is optically connected to fiber 508 through looping fiber 510. Alternatively, when it is desired to rotate arm 526 from the second switching position as shown in FIG. 20B to the first position as shown in FIGS. 19 and 20A, a constant current in different polarity is passed through coils 542 and 544 such that a repulsive magnetic force is generated to repel magnet 534 away from stopper plate 536 and an attractive magnetic force is generated to move magnet 523 toward stopper plate 536. As magnet 532 contacts stopper plate 536, fiber 504 is accurately aligned to fiber 508, fiber 502 accurately aligned with fiber 506, and fiber ends 510a, 510b are left optically open. In the above description, a constant current is used; it will be understood that a current pulse may be used instead provided the repulsive and attractive forces generated thereby are adequate to cause switch 500 to be switched from one position to the other.

The above description of method and apparatus is merely illustrative thereof, and various changes of the details of the method and apparatus may be within the scope of the appended claims.

I claim:

1. An optical switching device comprising:
   n fixed optical fibers, n being an integer greater than 1, said n fibers located so that one end of each fiber is optically aligned with a center point and so that said ends of the fibers are substantially coplanar;
   an optical fiber rotatable about an axis through said point, said fiber being coplanar with the n fixed fibers;
   a stepping motor for rotating the rotatable fiber;
   a stepping motor control system for controlling the rotation of the stepping motor to align the rotatable fiber with any one of the n fixed fibers, so that the stepping motor rotates the movable fiber by one of n preset numbers of steps, each of said n numbers of steps corresponding to the position of a fixed fiber, so that when the rotatable fiber is rotated by a number of steps selected from said n numbers of steps, the movable fiber will be substantially optically aligned with the fixed fiber whose position corresponds to said selected number of steps;
   wherein the fixed fibers are arranged so as to permit the rotatable fiber to rotate freely to align with the desired fixed fiber.

2. The device of claim 1, further comprising:
   a support member for supporting the n fixed fibers, one side of said support member serving as a stopper;
   a switch for controlling the stepping motor connected to the stopper;
   a rotatable member for supporting the rotatable fiber, said rotatable member rotatable about said axis to rotate the rotatable fiber, said member being positioned so that when it is rotated towards the stopper to contact the stopper, it will activate the switch to turn off the stepping motor.

3. The device of claim 1, wherein the stepping motor rotates the rotatable member by steps of 0.9 degrees each.

4. The device of claim 3, wherein the fixed fibers are so positioned that 20 steps are required to rotate the rotatable fiber from a position where the rotatable fiber is in substantial alignment with one fixed fiber to a position where it is in substantial alignment with an adjacent fixed fiber.

5. The device of claim 1, where n is 9.

6. The device of claim 1, wherein said stepping motor control system comprises:
   a driver for driving the stepping motor for a predetermined angle upon receipt of a trigger pulse;
   a pulse generator for supplying trigger pulses to the driver;
   a counter for counting the number of pulses supplied by the pulse generator to the driver, said number defining the count in the counter;
   comparator means responsive to the count in the counter for comparing the count to the selected number of steps, the comparator having an output indicative of whether the count is greater than or equal to the selected number; and
   means responsive to the output of the comparator for stopping pulses from the pulse generator to the driver when the comparator output indicates that the count is equal to or greater the selected number.

7. The device of claim 6, wherein said means for stopping pulses comprises an AND-gate, wherein said pulses from the pulse generator are supplied to one input of the AND-gate and the output of the comparator connected to the other input of the AND-gate, wherein the output of the AND-gate is connected to the driver to supply pulses to the driver for driving the stepping motor, and wherein the output of the comparator is low when the count is equal to or greater than the selected number.

8. The device of claim 1, wherein the n fixed fibers span an arc of less than 180 degrees, said arc having the center point as its center, so that the n fixed fibers do not block the rotatable fiber when it is rotated by the stepping motor to align with any one of the n fixed fibers.

9. The device of claim 1, wherein the entire length of the rotatable fiber is coplanar with the n fixed fibers.

10. An optical switching device comprising:
   n fixed fibers, n being an integer greater than 1, said fibers located so that one end of each fiber is optically aligned with a center point and so that said fibers are substantially coplanar;
   an optical fiber rotatable about an axis through said point, said fiber being substantially perpendicular to said axis and coplanar with the fixed fibers;
   a stepping motor for rotating the rotatable fiber;
   a stepping motor control system for controlling the rotation of the stepping motor to align the rotatable fiber with any one of the n fixed fibers, so that the stepping motor rotates the movable fiber by one of n preset numbers of steps, each of said n numbers of steps corresponding to the position of a fixed fiber, so that when the rotatable fiber is rotated by a number of steps selected from said n numbers of steps, the movable fiber will be substantially optically aligned with the fixed fiber whose position corresponds to said selected number of steps;
   wherein the fixed fibers are arranged so as to permit the rotatable fiber to rotate freely to align with the desired fixed fiber.

11. The device of claim 10, wherein the n fixed fibers span an arc of less than 180 degrees, said arc having the center point as its center, so that the n fixed fibers do not block the rotatable fiber when it is rotated by the stepping motor to align with any one of the n fixed fibers.

12. The device of claim 10, wherein the full length of the rotatable fiber is coplanar with the n fixed fibers.

* * * * *